(12) United States Patent
Sugar et al.

(10) Patent No.: US 8,716,877 B2
(45) Date of Patent: May 6, 2014

(54) METHOD AND APPARATUS FOR HARVESTING ENERGY FROM ANKLE MOTION

(76) Inventors: Thomas Sugar, Tempe, AZ (US); Joseph K. Hitt, Fairfax, VA (US); Alex Boehler, Tempe, AZ (US); Kevin Hollander, Phoenix, AZ (US); Jeffrey A. Ward, Phoenix, AZ (US)

( * ) Notice: Subject to any disclaimer, the term of this patent is extended or adjusted under 35 U.S.C. 154(b) by 83 days.

(21) Appl. No.: 13/108,516

(22) Filed: May 16, 2011

(65) Prior Publication Data
US 2011/0278857 A1    Nov. 17, 2011

Related U.S. Application Data

(60) Provisional application No. 61/334,675, filed on May 14, 2010.

(51) Int. Cl.
| F02B 63/04 | (2006.01) |
| F03G 7/08  | (2006.01) |
| H02K 7/18  | (2006.01) |
| H02K 35/02 | (2006.01) |
| F02B 71/04 | (2006.01) |

(52) U.S. Cl.
CPC *F03G 7/08* (2013.01); *H02K 35/02* (2013.01); *F02B 63/04* (2013.01); *F02B 71/04* (2013.01)
USPC ........................................................ 290/1 R

(58) Field of Classification Search
CPC ............. F03G 5/06; F03G 7/08; H02K 35/02; H02K 7/1853; F02B 63/04; F02B 71/04
USPC ........... 290/1 R; 601/5, 23, 33; 482/51; 322/1
See application file for complete search history.

(56) References Cited

U.S. PATENT DOCUMENTS

| 6,182,378 | B1 | 2/2001 | Sendaula |
| 6,239,501 | B1 | 5/2001 | Komarechka |
| 7,645,246 | B2 | 1/2010 | Rastegar et al. |
| 7,652,386 | B2 | 1/2010 | Donelan et al. |
| 7,659,636 | B2 | 2/2010 | Donelan et al. |
| 7,703,562 | B2 | 4/2010 | Kalik |
| 7,956,476 | B2 | 6/2011 | Yang |
| 2006/0046907 | A1* | 3/2006 | Rastegar et al. ................ 482/91 |
| 2008/0277943 | A1* | 11/2008 | Donelan et al. ............... 290/1 R |
| 2010/0160122 | A1 | 6/2010 | Rastegar et al. |
| 2010/0319215 | A1 | 12/2010 | Roser |

OTHER PUBLICATIONS

Paradiso, J., and T. Starner, "Energy Scavenging for Mobile and Wireless Electronics," Pervasive Computing, 2005, p. 18-27.*

* cited by examiner

*Primary Examiner* — Javaid Nasri
(74) *Attorney, Agent, or Firm* — The Belles Group, P.C.

(57) ABSTRACT

A method for harvesting energy from ankle motion includes coupling a generator module across an ankle joint, the generator module including a generator and an elastic member. The generator is affixed to the leg shank and at least one of the generator and the elastic member is continuously coupled to the foot across the ankle joint. Energy may be harvested in the elastic member while generating electricity with the generator from motion of the ankle joint. Alternatively, or in addition, electricity may be generated with the generator from energy harvested in the elastic member after the energy is harvested.

18 Claims, 17 Drawing Sheets

1) Generator Housing
2) Top Pulley Capture
3) Bottom Spindle
4) Bottom Spindle Capture
5) Bottom Housing
6) Spring
7) Ball-screw Assembly
8) Cord Pull Capture
9) Roller Bearings
10) Motor Housing
11) Generator
12) Generator Pulley Capture
13) Belt Tensioning Pivot Screw
14) Ball-screw Pulley
15) Generator Pulley 27) Lace bound chasis
28) Shank pad
29) Toe plate
30) Generator

METHOD AND APPARATUS FOR HARVESTING ENERGY FROM ANKLE MOTION

PRIORITY

Priority is claimed to U.S. provisional application No. 61/334,675, filed May 14, 2010, the disclosure of which is incorporated herein by reference in its entirety.

BACKGROUND OF THE INVENTION

1. Field of the Invention

The field of the present invention is methods and apparatuses for producing electrical energy from body motion, and in particular ankle motion of the human body.

2. Background

Over the past years the number of electrically powered devices carried by people has greatly increased; the additional batteries needed to power these devices have also increased. Many researchers have attempted to harvest energy from human kinetics. In one example, 2.5 Watts of energy was harvested from the knee joint with a 1.6 kg device (1.6 W/kg). Donelan, J. M., Q. Li, V. Naing, J. A. Hoffer, D. J. Weber, A. D. Kuo, "Biomechanical Energy Harvesting: Generating Electricity During Walking with Minimal User Effort, *Science* 8 Feb. 2008: Vol. 319. no. 5864, pp. 807-810. Other devices include a shake driven flashlight (1.3 W/kg), and a backpack with piezoelectric crystals in the straps (7.4 Watts from 38 kg load at fast walking). Rome, L C, L Flynn, E M Goldman, and T D Yoo. "Generating electricity while walking with loads." Science, 309:1725-1727, 2005.

Other approaches have attempted to harvest energy from the heel strike. In one instance, an electrostatic generator was constructed by compressing a dielectric elastomer at the heel (0.8 Watts at 2 steps/sec). However, the durability of this device is low, on the order of 100,000 steps. Paradiso, J., and T. Starner, "Energy Scavenging for Mobile and Wireless Electronics," Pervasive Computing, 2005, pg 18-27. This last reference also describes the production of a shoe with spring/generator system at the heel which produced only 0.25 Watts during heel strike. It also describes placing piezoelectric crystals in the insole, but only about 0.01 Watts of energy was produced.

U.S. Pat. Nos. 7,659,636 and 7,652,386, both to Donelan, describe a method for energy harvesting across the knee joint using sensors to disengage one of the mechanical coupling of the generator from the joint or to disengage the electrical generator from the load.

U.S. Pat. No. 7,645,246 to Rastegar describes a device for harvesting energy form ankle motion having a spring which is selectively engaged and disengaged during select periods of the walking gait cycle. The engagement occurs only during the range of ankle motion from which energy is to be harvested. The engagement/disengagement mechanisms are described as being both power-activated or manual, with both types achieving the purpose of not inducing resistance in the gait cycle during those periods when energy is not being harvested.

Methods for energy harvesting have also had poor results in the past due to the difficulty of attaching the generator to the joint and efficiently harvesting the electricity.

SUMMARY OF THE INVENTION

The present invention is directed toward a method and apparatus for harvesting energy from body motion. At least one of an elastic member and a generator module are continuously coupled between the leg shank and the foot across the ankle joint. With this configuration, energy may be harvested by the elastic member and electricity generated by the generator.

In a first separate aspect of the present invention, the generator is affixed to the leg shank and is continuously coupled to the foot across the ankle. With this configuration, energy may be concurrently harvested by the elastic member while electricity is generated by the generator. The elastic member and the generator may be mounted in parallel with the Achilles tendon, or the elastic member by be mounted in series with the Achilles tendon underneath the midsole of the foot. The energy may be harvested and the electricity generated through any movement of the ankle joint, such as flexing of the ankle joint in the upward or downward direction, flexing in any direction during ambulation, standing, squatting, sitting, bouncing the knee, rocking the leg, performing knee bends, and performing leg presses. Electricity may also be generated from motion of the ankle joint using energy harvested in the elastic member during a period of the motion which occurs other than when energy is harvested.

In a second separate aspect of the present invention, the generator is coupled across a joint, preferably the ankle joint, and is configured to convert slow angular motion with large moments to high angular motion with smaller moments through the very high gear ratio. The very high gear ratio may be achieved utilizing a combination of one or more of a lever arm, rotary to linear transmission, belt, and spindle. Alternatively, the very high gear ratio may be achieved utilizing a lever arm, a ball screw, a pulley and belt, and a spindle in a back-drivable gear system. A spindle and a flexible or rigid link may couple the generator across the joint. The spindle may include a shaft having a circular or non-circular shape.

In a third separate aspect of the present invention, an energy harvesting apparatus includes a joint coupling having a first coupling part affixed to the leg shank of the wearer and a second coupling part affixed to the foot of the wearer. The joint coupling is configured to permit the ankle joint of the wearer to flex along at least two pivot axes. The generator is affixed to one of the coupling parts and coupled across the ankle joint to the other of the coupling parts. The generator is configured to generate electricity from motion of the ankle joint along each of the two pivot axes. The first and second coupling parts may be coupled by a first joint configured to allow upward and downward pivoting of the ankle and by a second joint configured to allow lateral pivoting of the ankle joint. The second coupling part may affix to the outside of a shoe, fit within the shoe, or be incorporated into the shoe. The second coupling part may also affix to the top of the shoe, and may affix to the toe box of the shoe.

In a fourth separate aspect of the present invention, any of the foregoing aspects may be employed in combination.

Accordingly, an improved method and apparatus for harvesting energy from body motion are disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
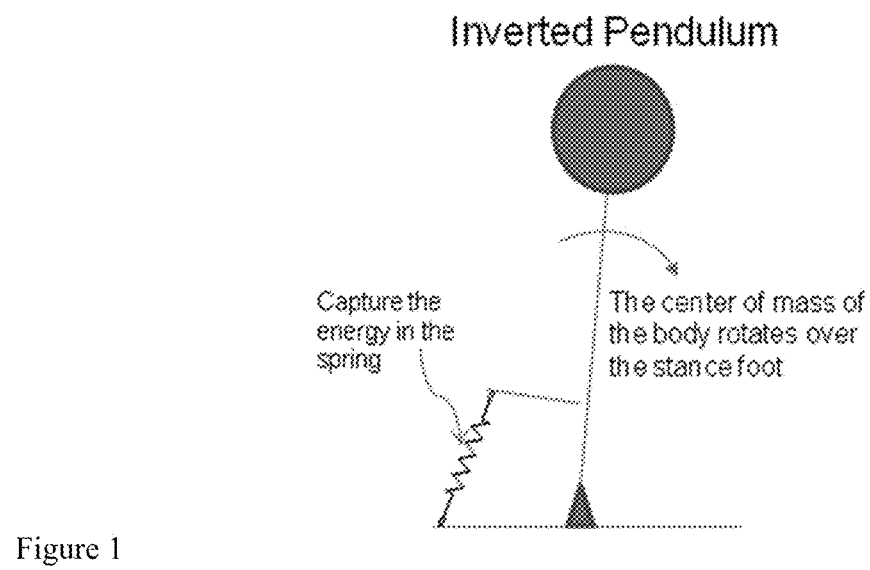
FIG. 1 illustrates an inverted pendulum model as a representation of the ankle joint.
Figure 2:
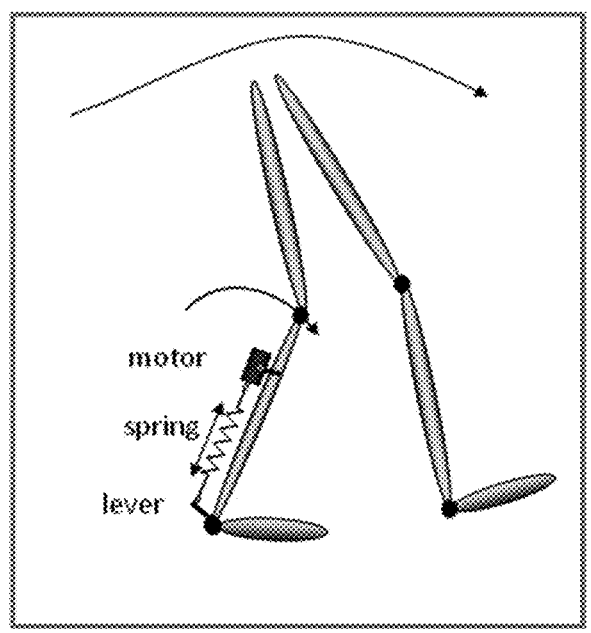
FIG. 2 schematically illustrates a conceptual model of storing energy during ambulation.
Figure 3:
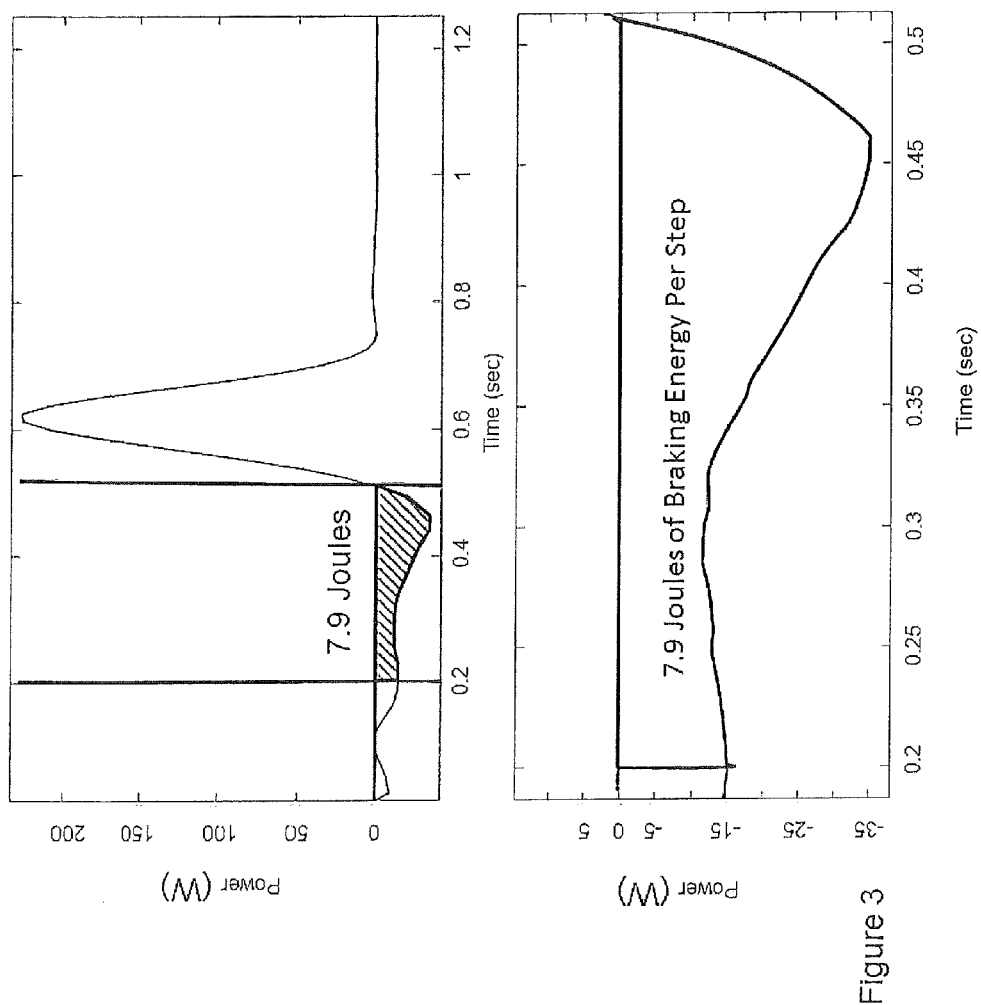
FIG. 3 graphically illustrates ankle power during walking with an elastic member placed in parallel with the Achilles tendon.

A major and unexplored energy harvesting opportunity comes from the braking in the ankle joint. FIG. 1 illustrates a an inverted pendulum model from which energy can be captured through the use of springs as the center of mass of the body rotates over the stance foot. This model is representative of part of the range of motion found in the ankle during the gait cycle (walking and running) as the mass of the torso rotates over the planted foot. In the stance phase of the gait cycle, the shank rolls over the ankle, creating energy that may be harvested. Energy may also be harvested at the ankle as the leg rocks back and forth. This stance phase of the gait cycle makes up about 20% to 40% of a single gait cycle. FIG. 2 highlights a pictorial representation of this action, with a spring mounted in parallel with the Achilles tendon. FIG. 3 illustrates the power realized at the ankle joint during this interval. During walking, as the ankle is flexed in an upward direction between 0.2 and 0.5 seconds, the power is negative. The area/energy between 20% and 40% of the gait cycle represents a possible 7.9 Joules of energy produced during each step.

Figure 4:
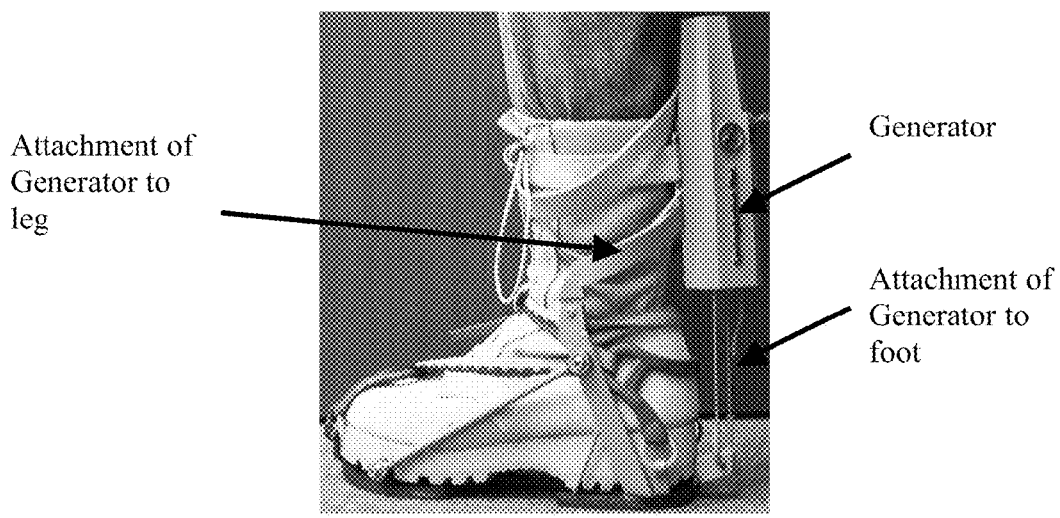
FIG. 4 illustrates an energy harvesting apparatus affixed to an ankle.

The generator shown in FIG. 4 aids in harvesting this energy as electrical energy. As shown in FIG. 4, the harvesting module is attached to the leg in the rear. The harvesting module houses an elastic member, in this case a spring, to store energy, a generator, and a cord, which couples both the spring and the generator to the foot across the ankle joint. In this harvesting module, the spring is placed in parallel with the generator. During operation, as the ankle flexes in the upward direction, i.e., the angle between the foot and the shin is decreasing, the cord pulls on the generator causing it to spin and compressing the spring in parallel with the generator. As the ankle flexes in the downward direction, i.e., the angle between the foot and the shin is increasing, the cord becomes slack, thereby allowing the spring to extend, which causes the generator to spin in the opposite direction. The generator may generate electricity while spinning regardless of the direction of spin. Unlike the prior art which describes engaging and disengaging the spring and the energy harvesting generator from the ankle motion, in this apparatus at least one of the generator and the spring remain continuously coupled with the foot across the ankle the need for sensors, clutches, braking systems or the like to activate or deactivate the energy generating system.

The upward and downward flexing of the ankle joint defines a first pivot axis of the joint. As is discussed further below, a second pivot axis is defined by lateral pivoting of the ankle joint. Motion along both pivot axes, alone or in combination, may be used to harvest energy from the ankle joint.

Multiple methods of harvesting energy and generating electricity have been explored with this system. Four distinct methods have been explored in connection with the system just described. In each, even though the elastic member is described as being a spring, any appropriately elastic material, device, or system may be used.

Method A: Harvesting energy in the elastic member and generating electricity later. In this method, as the ankle is flexed in either of the upward or downward direction, energy is stored in the spring. At a later time, when the foot is moved in the opposite direction, the spring is used to spin the generator to create electricity. During the period in which energy is being stored in the spring, a clutch or brake disengages the spring from the generator. Following the energy storing period, the clutch or brake engages the spring with the generator, thereby allowing the energy stored in the spring to spin the generator and producing electricity. In this process, the generator typically spins in one direction only, and the spring is constantly engaged with the foot across the ankle joint.

Method B: Harvesting energy in the elastic member and generating electricity concurrently. In this method, the spring is mounted in parallel with the generator, such that the two are continuously coupled together. Both are also continuously coupled to the foot across the ankle. As the ankle is flexed in either of the upward or downward direction, energy is stored in the spring and at the same time the generator spins creating electricity. Thus, in this method, the generator may spin in both directions to generate electricity.

Method C: Harvesting energy in an elastic member and generating electricity concurrently and at a later time. In this method, the spring is mounted in parallel with the generator, such that the two are continuously coupled together. Both are also continuously coupled to the foot across the ankle. As the ankle is flexed in either of the upward or downward direction, energy is stored in the spring and at the same time the generator spins creating electricity. When the ankle is flexed in the opposite direction, the energy stored in the spring is used to spin the generator in the opposite direction to create electricity. Thus, in this method, the generator typically spins in both directions to generate electricity, and it spins during most or all of the gait cycle to generate electricity.

Method D: Harvesting energy in an elastic member and generating electricity concurrently as the ankle is flexed upward or downward. In this method, as the ankle is flexed in the upward or downward direction, energy is stored in the spring and at the same time the generator spins creating electricity. A rigid linkage attaches the generator to the foot. When the ankle is flexed in the upward or downward direction, the spring and rigid linkage are both used to spin the generator to create electricity. Thus, in this method, the generator typically spins in both directions to generate electricity.

Figure 5:
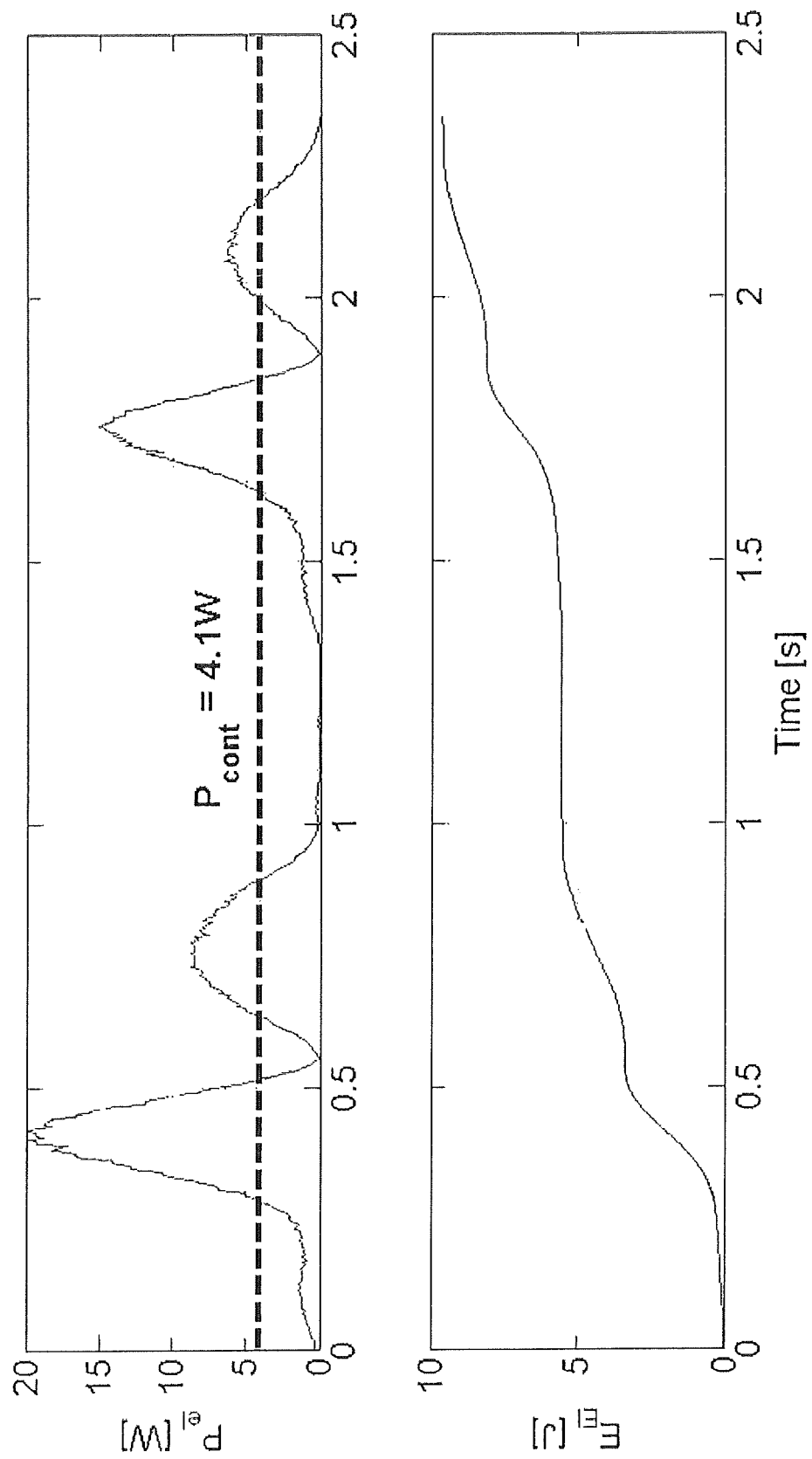
FIG. 5 graphically illustrates electrical power that may be generated as a person takes two steps.

Using Method C, electricity may be generated as the ankle is flexed in an upward direction, creating the first power peak (about a 15-20 W peak). As the leg rolls over the ankle, the spring is compressed inside the generator module and the generator spins. Electricity is generated during this phase and energy is harvested in the spring as it is compressed. As the heel rises off of the ground, the spring spins the generator in the opposite direction, generating the second power peak (about a 6-8 W peak). The two power peaks per step are shown in FIG. 5. Using this method, about 4.1 W of continuous power, or nearly 5 Joules per step, may be generated.

Figure 6:
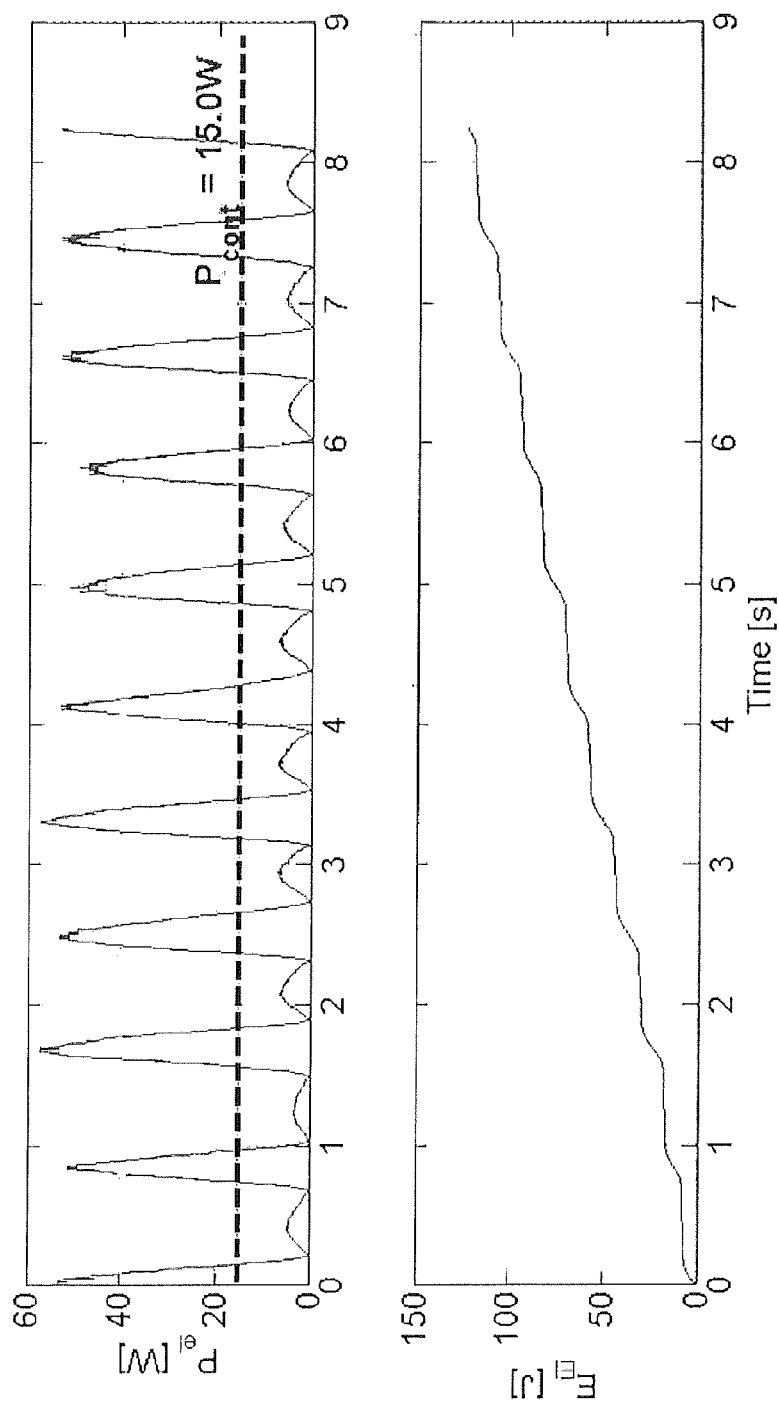
FIG. 6 graphically illustrates electrical power that may be generated by a person standing and rocking their leg back and forth.

Using Method B, power peaks of about 50 W were observed when the wearer performed knee bends rocking their leg quickly back and forth, meaning about 15 W of continuous power can be achieved, as is shown in FIG. 6.

Energy can be harvested at the ankle during ambulation such as walking, jogging, and running. Energy can also be harvested as the ankle moves during other activities such as standing, squatting, sitting, bouncing the knee, and performing leg presses. In a second standing method, a user was asked to rock their leg back and forth at a high rate. Using Method D, rigid links were attached from the generator to the foot. The generator spins in both directions as the foot is flexed during in an upward and downward direction. Using this method, an average power of 1.5 W walking and 8.6 W as the user rocked their leg while standing and performing knee bends was produced.

Figure 7:
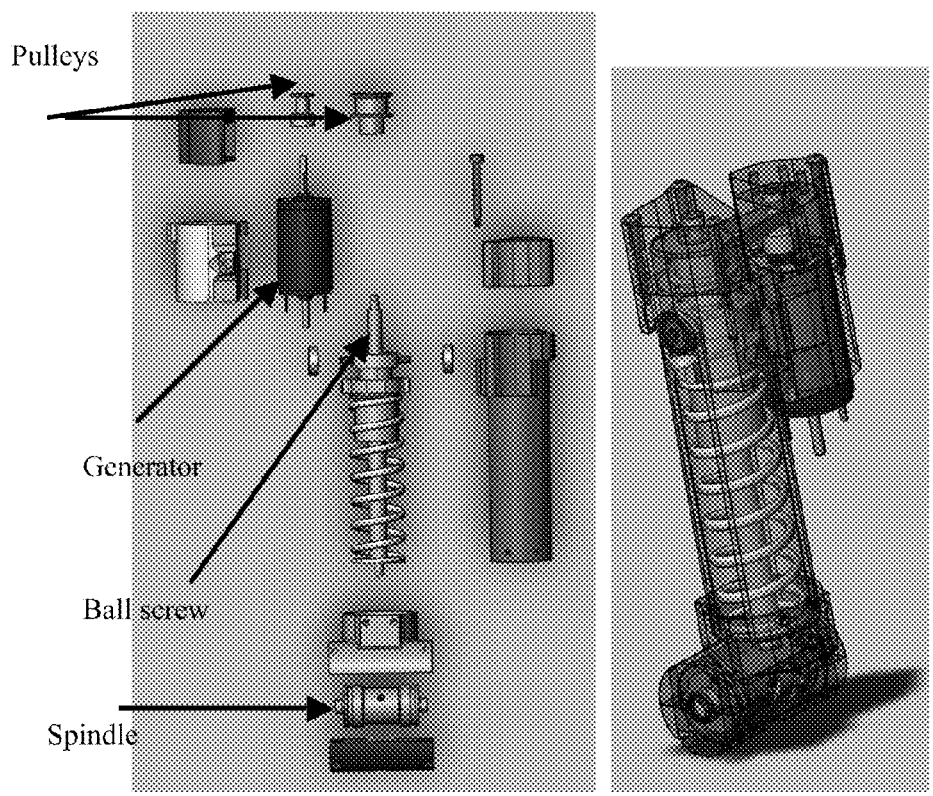
FIG. 7 illustrates a generator for harvesting energy from ankle motion.
Figure 8:
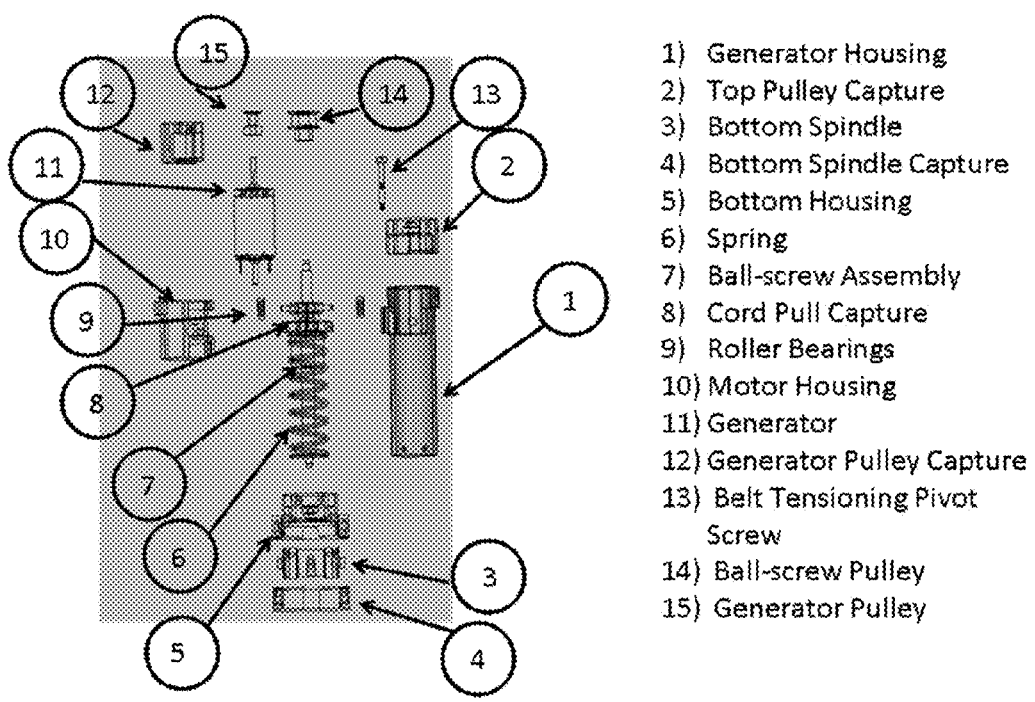
FIG. 8 is an exploded view of the generator of FIG. 7.
Figure 9:
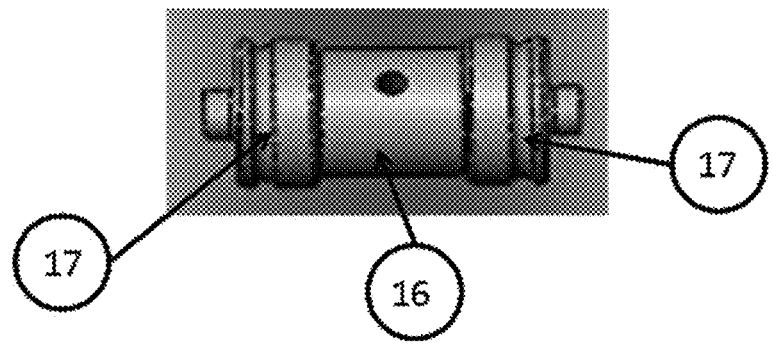
FIG. 9 illustrates the bottom spindle of the generator of FIG. 7.
Figure 10:
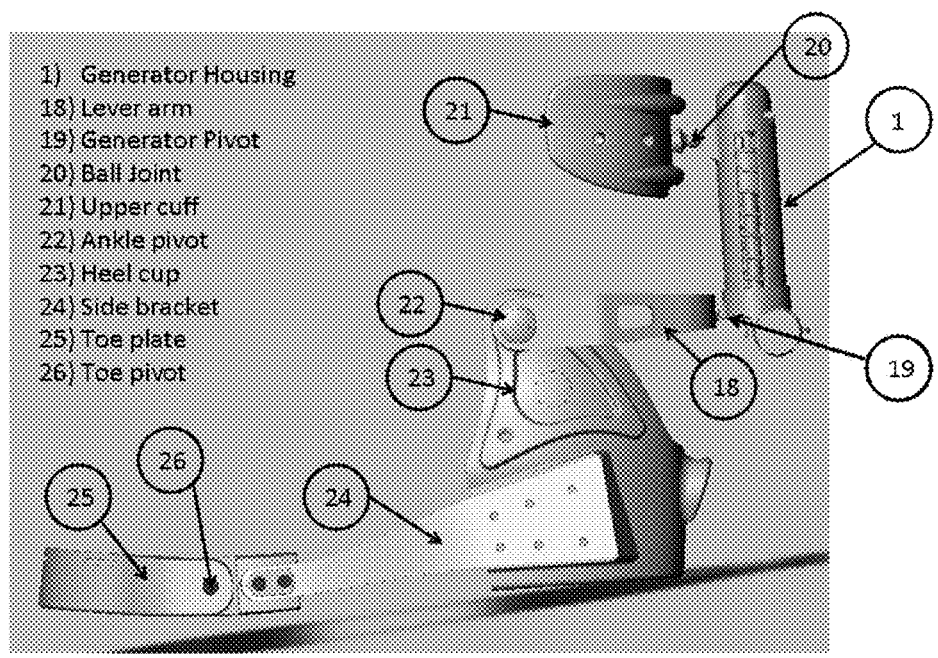
FIG. 10 illustrates the apparatus for strapping a generator across the ankle.

The generator module is a sophisticated mechanical attachment that allows the ankle joint to move in multiple directions. In its design, the generator is able to efficiently convert mechanical motion to electricity. The design includes a very high gear ratio that is also compact and lightweight. The generator is able to convert small, slow ankle motions with large torques to very fast, multiple rotations with low torque, thereby producing electricity. In doing this, the generator is coupled to the ankle joint to convert slow angular motion with large moments to high angular motion with smaller moments using a combination of one or more of a lever arm, rotary to linear transmission, belt, and spindle to create a very high gear ratio. In one embodiment, as shown in FIG. 7, a ball-screw, set of pulleys, and a spindle are used to create the very high gear ratio.

The generator (11) is mounted to the module housing (10). A small generator pulley (15) is mounted to the shaft of the generator and is captured by the generator pulley capture (12). The larger ball-screw pulley (14) is mounted to the top of the ball screw assembly (7). A belt links the ball-screw pulley (14) and the generator pulley (15). The motor housing (10) pivots on the generator housing (1). The belt tensioning pivot screw (13) pushes against the generator housing (1) to increase the angle between the motor housing (1) and the generator housing (1). As the angle increases, the belt tension is increased.

The top pulley capture (2) holds the ball-screw pulley (14). The bottom spindle (3) has two circular surfaces (16) and (17). One cord is wrapped around the smaller inside circular surface (16) and is attached to the foot. A second cord is wrapped around the outside circular surfaces (17) is attached to the cord pull capture (8). The spindle allows for a second gear ratio comparing the radius of the two circular surfaces (16) and (17). The first inner surface (16) does not have to be a cylinder but can have a non-circular shape to achieve different gear ratios.

The bottom spindle (3) is captured by the bottom spindle capture (4) and bottom housing (5). The spring (6) is mounted in parallel to the ball screw assembly (7). As the ball screw spins and the ball nut moves downward, the spring is compressed storing energy. As the spring extends, it pushes the ball nut upward.

The cord pull capture (8) allows one cord to be affixed to the ball screw assembly (7) and attached to two places on the bottom spindle (3) at (17). One cord is used and attached at two places to minimize the bending loads on the ball screw assembly (7). Two roller bearings (9) are mounted to the ball screw assembly (7). The two roller bearings (9) roll against two slots in the generator housing (1) as the ball nut travels upward and downward.

In one embodiment, the spindle radius at 16 is 0.65 in and the spindle radius at 17 is 0.77 in. The pitch of the ball screw is 2 mm. The generator pulley 15 has 10 teeth and the ball-screw pulley 14 has 24 teeth. With the pulley ratio, ball screw pitch, and bottom spindle (3), the generator gear ratio is 226.2. A lever arm 18 is used to attach the generator to the foot with a length of 5 inches. The total gear ratio of the system is 938. Even with this very large gear ratio, the system is quite efficient and back driveable.

The joint coupling is a mechanical attachment for the generator module and allows the ankle joint to move in multiple directions. In one embodiment, the mechanical structure includes a shoe harness which is strapped on to the shoe. The generator housing (1) is attached to the lever arm (18). The generator housing (1) pivots at the generator pivot (19) and the ball joint (20). The upper cuff (21) is strapped on to the shank or tibia. The lever arm (18) pivots about the ankle pivot (22). The heel cup (23) is strapped on to the shoe. The side bracket (24) connects the heel cup (23) to the toe plate (25). The toe plate is allowed to freely rotate at the toe pivot (26).

Figure 11:
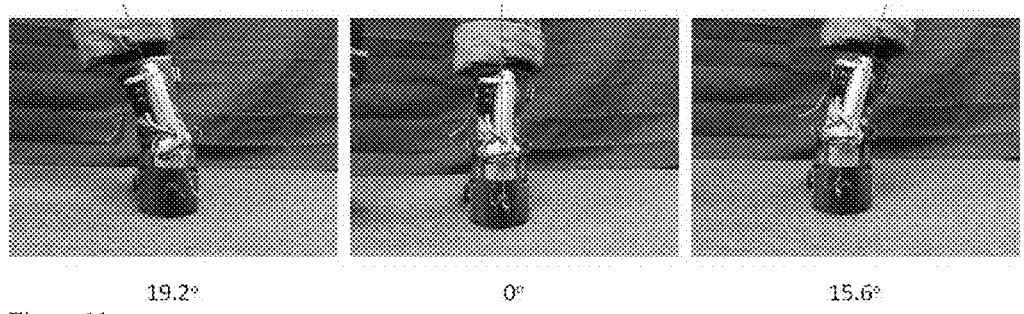
FIG. 11 illustrates lateral motion of an ankle wearing the apparatus of FIG. 10.

As shown in FIG. 11, because the generator housing (1) is allowed to pivot at (19) and (20), the shank or leg is allowed to move laterally relative to the heel cup (23). The shoe can naturally flex at the metatarsal joints with the addition of the toe pivot (26). The sophisticated structure with multiple joints allows the system to feel comfortable.

Figure 12:
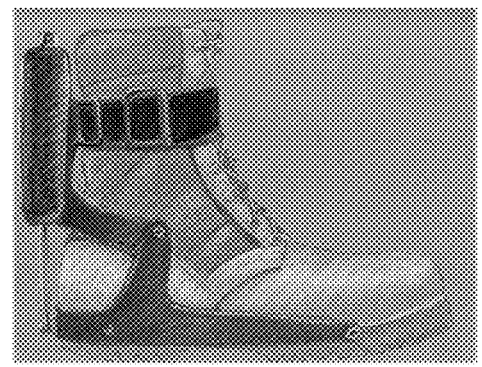
FIG. 12 illustrates the apparatus of FIG. 10 affixed to a shoe.

In a second embodiment, the heel cup (23) can be mounted inside the shoe. In a third embodiment, the mechanical structure can be affixed directly to the sole of a shoe, as shown in FIG. 12.

Figure 13:
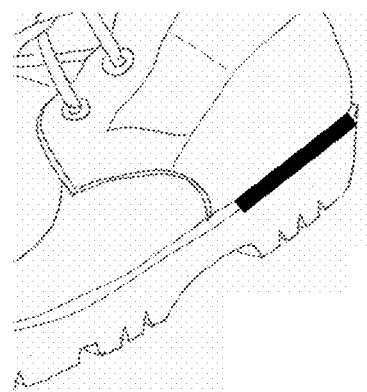
FIG. 13 illustrates a sandwich plate in a shoe to which the apparatus of FIG. 10 may be affixed.

In a fourth embodiment, a plate mounted at the heel can be sandwiched between the outer sole and insole board of the shoe, as shown in FIG. 13. The mechanical structure can be affixed directly to the plate.

Figure 14:
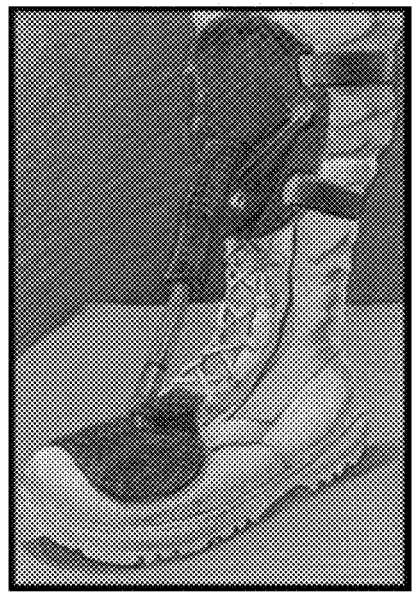
FIG. 14 illustrates a generator apparatus mounted in front of a leg.
Figure 15:
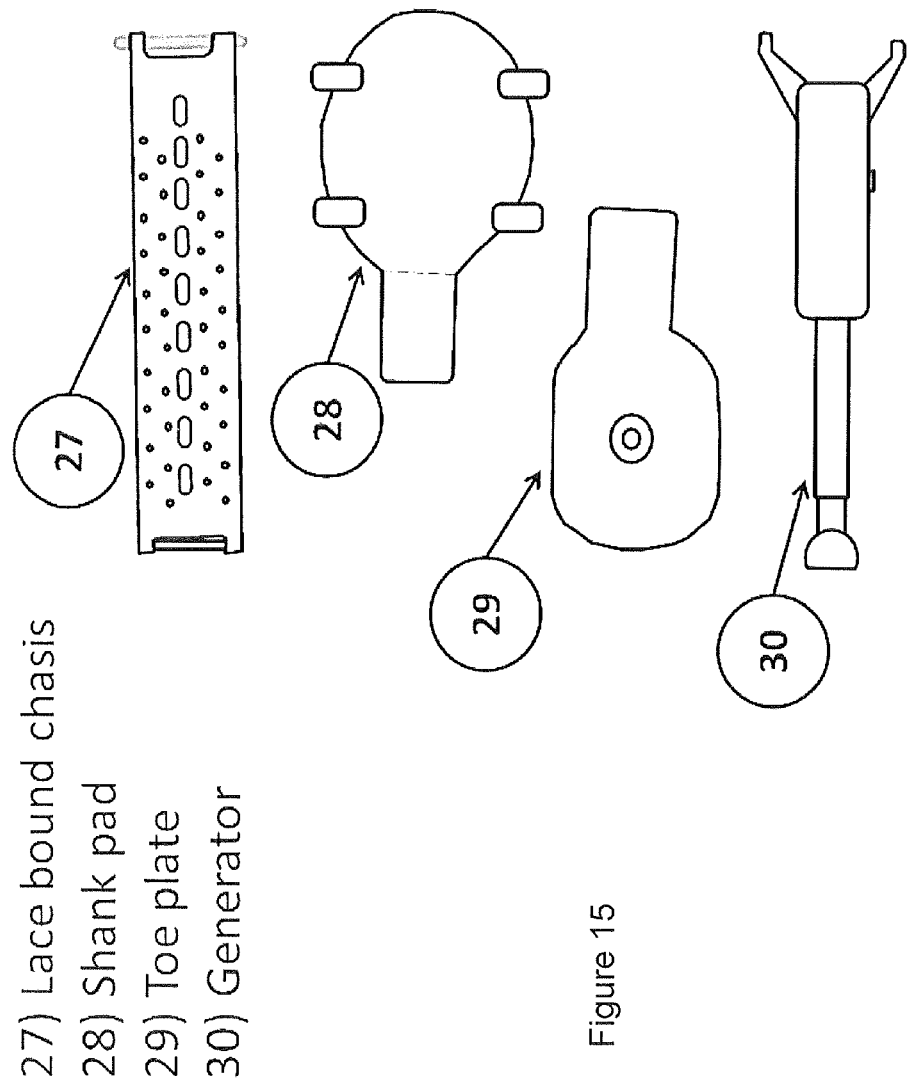
FIG. 15 illustrates the parts of the apparatus of FIG. 14.

In a fifth embodiment, the generator is mounted in front of the leg as shown in FIG. 14. The different parts of the mounting system are illustrated in FIG. 15. A lace bound chassis (27) is flexible and strong in tensile loading. A shank pad (28) is strapped to the shank or tibia and is attached to the upper portion of the lace bound chassis (27). The toe plate (29) rests on top of the toe box of the shoe and is attached to the lower portion of the lace bound chassis (27). The generator module (30) snaps on to the shank pad (28) and the toe plate (29). The generator pivots at the shank pad (28) and freely pivots with a ball joint or universal joint at the toe plate (29). When the generator module (30) is compressed as the foot moves in an upward direction, the lace bound chassis (27) is pulled in tension. Alternatively, the lace bound chassis may be omitted if the generator module is directly affixed to the shoe across the ankle joint. In this design, the shoe is pulled in tension when the generator module (30) is compressed.

The lace bound chassis (27) can be laced into any shoe or boot. It is made from a strong, flexible, textile mesh. The shank pad (28) distributes the load so that it is comfortable. It can be easily attached and detached using straps. It is made from a contoured piece of thermoplastic, plastic, or carbon fiber. The generator module (30) is mounted in front of the leg and is compressed when the foot moves in an upward position. The system allows for freedom of moving in the ankle in any direction. Because the system is in tension during loading, an exo-structure is not needed.

Figure 16:
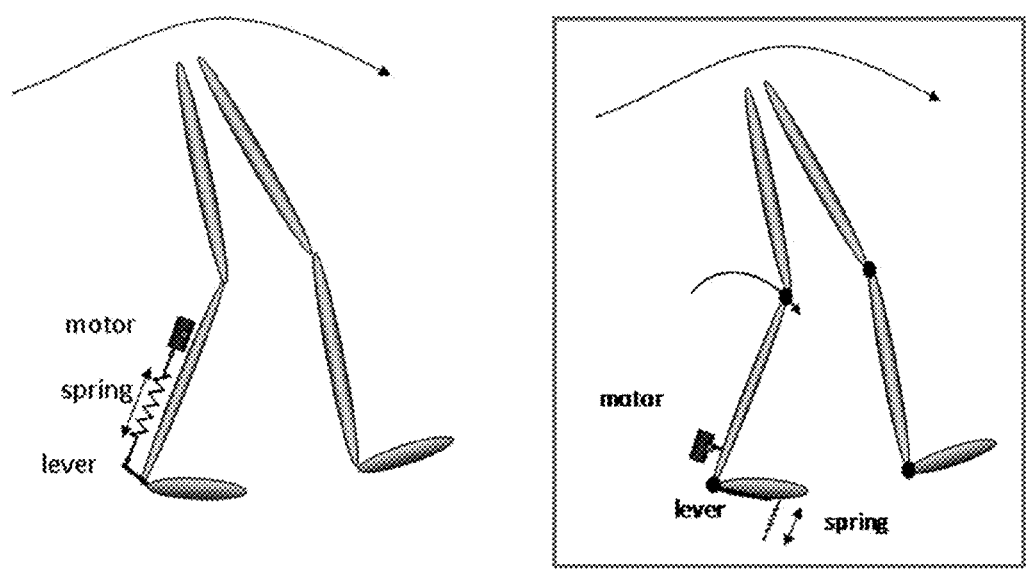
FIG. 16 illustrates an elastic member mounted in series with the Achilles tendon.

The spring can be mounted in parallel with the Achilles tendon or in series with the Achilles tendon, as shown in FIG. 16. If the spring is mounted in a series configuration with the Achilles tendon, as the foot lands on the ground, the weight of the body compresses the springs in the forefoot. As the foot comes off of the ground during the swing phase, the spring extends.

The generator can be attached to the mechanical structure using a flexible or rigid link. In one embodiment, the bottom spindle 3 is attached to the heel cup 23 using a flexible link such as a cord. In a second embodiment, the bottom spindle 3 can be attached to the heel cup 23 using a rigid link. In the mechanical structure mounted in front of the leg, the generator 30 is a rigidly attached to the shank pad 28 and the toe plate 29.

The charging circuit which receives the generated electricity can be mounted at the shoe, on the leg, or on the hips.

Figure 17:
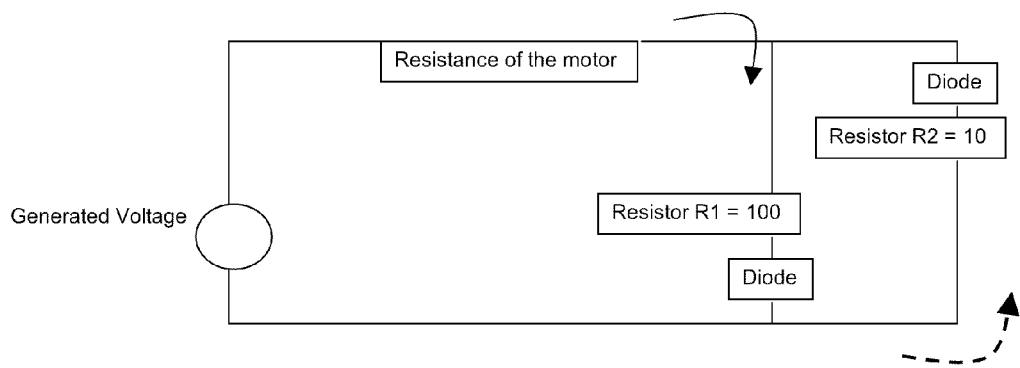
FIG. 17 illustrates a resistive circuit which may be used for controlling how much energy is harvested from an attached generator.

The resistance attached to the motor leads determines how easy the generator can spin and how much energy can be harvested. If the resistance is very high, then the motor spins freely, but little current flows. On the other hand, if the resistance attached to the motor leads is very low, then the motor spins slowly, and more current flows. A dual resistive circuit is shown in FIG. 17 that uses two resistors and two diodes. In one direction, the current will flow through the 100 Ohm resistor. In the opposite direction, the current will flow through a parallel resistor with a resistance of 10 Ohm. During walking R1 was 22 Ohm and R2 was 47 Ohm. Using the device as a standing generator, R1 was 10 Ohm and R2 was infinite.

Thus, a method and apparatus for harvesting energy from ankle motion are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A method for harvesting energy from ankle motion comprising:
    coupling a generator module across an ankle joint, the generator module including a generator and an elastic member coupled in parallel, the generator being affixed to the leg shank and continuously coupled to the foot across the ankle joint; and
    harvesting energy in the elastic member during a first period of the ankle motion;
    generating electricity with the generator during the first period of the ankle motion, concurrently with the harvesting of energy in the elastic member; and
    generating electricity with the generator from the enema harvested in the elastic member during a second period of the ankle motion, the first period of the ankle motion being different from the second period of the ankle motion.

2. The method of claim 1, wherein harvesting energy in the elastic, member includes harvesting energy in the elastic member while ankle flexes in one of the upward direction or the downward direction.

3. The method of claim 1, wherein harvesting energy in the elastic, member includes harvesting energy in the elastic member from the ankle motion during one or more of standing, squatting, sitting, bouncing the knee, rocking the leg, performing knee bends, and performing leg presses.

4. The method of claim 1, wherein harvesting energy in the elastic member includes harvesting energy in the elastic member while generating electricity from the motion of the ankle joint during ambulation.

5. The method of claim 1, wherein the generator and the elastic member are mounted in parallel with the Achilles tendon.

6. The method of claim 1, wherein the elastic member is mounted underneath a midsole of the foot.

7. A method for harvesting energy from ankle motion comprising:
    coupling a generator module across an ankle joint, the generator module including a generator coupled in parallel to an elastic member, the elastic member being affixed to the leg shank and continuously coupled to the foot across the ankle joint;
    harvesting energy in the elastic member during a first period of the ankle motion, the first period of the ankle motion being as the ankle joint is flexed in one of an upward or downward direction;
    generating electricity with the generator during the first period of the ankle motion; and
    generating, electricity with the generator from energy stored in the elastic member during a second period of the ankle motion, the second period of the ankle motion being as the ankle joint is flexed in the other of the upward or downward direction.

8. The method of claim 7, wherein harvesting energy in the elastic member includes harvesting energy in the elastic member from the ankle motion during one or more of standing, squatting, sitting, bouncing the knee, rocking the leg, performing knee bends, and performing leg presses.

9. The method of claim 7, wherein harvesting energy in the elastic member includes harvesting energy in the elastic member while generating electricity from the motion of the ankle joint during ambulation.

10. An energy harvesting apparatus comprising:
    a joint coupling having a first coupling part affixed to a leg shank of a wearer and a second coupling part affixed to a foot of the wearer, wherein the joint coupling is configured to permit the ankle joint to flex along at least two pivot axes;
    a generator affixed to one of the first coupling part and the second coupling part and coupled across the ankle joint to the other of the first coupling part and the second coupling part; and
    an elastic, member coupled in parallel with the generator across the ankle joint, wherein the generator is configured to generate electricity directly from motion of the ankle joint along the at least two pivot axes during a first period of ankle motion; the elastic member is configured to store energy directly from motion of the ankle joint during the first period of the ankle motion, and the generator is configured to generate electricity from the stored energy of the elastic, member during a second period of the ankle motion, the first period being different from the second period.

11. The energy harvesting apparatus of claim 10, wherein the first and second coupling parts are coupled together by a first joint configured to allow upward and downward pivoting of the ankle joint, and a second joint configured to allow lateral pivoting of the ankle joint.

12. The energy harvesting apparatus of claim 10, wherein the second coupling part comprises a shoe strap configured to secure to a shoe of a wearer.

13. The energy harvesting apparatus of claim 10, wherein the second coupling part comprises a plate incorporated into a sole of a shoe.

14. The energy harvesting apparatus of claim 10, wherein the second coupling part comprises structure inserted into a shoe of the wearer.

15. The energy harvesting apparatus of claim 10, wherein the second coupling part comprises a shoe harness configured to receive and affix to a shoe of a wearer.

16. The energy harvesting apparatus of claim 10, wherein the second coupling part affixes to a top of a shoe of the wearer.

17. The energy harvesting apparatus of claim 16, wherein the second coupling part affixes to the shoe at a toe plate of the shoe.

18. The energy harvesting apparatus of claim 17 wherein one of the shoe or a chassis bound in laces of the shoe is pulled in tension as a generator module is compressed.

* * * * *